Feb. 1, 1938.  R. W. COLLISON  2,106,723
QUICK CLOSING AND SEALING VALVE
Filed Dec. 14, 1936  2 Sheets-Sheet 1

INVENTOR
ROBERT W. COLLISON
BY
Robert A. Lavender
ATTORNEY

Feb. 1, 1938.                R. W. COLLISON              2,106,723
                QUICK CLOSING AND SEALING VALVE
                    Filed Dec. 14, 1936           2 Sheets—Sheet 2
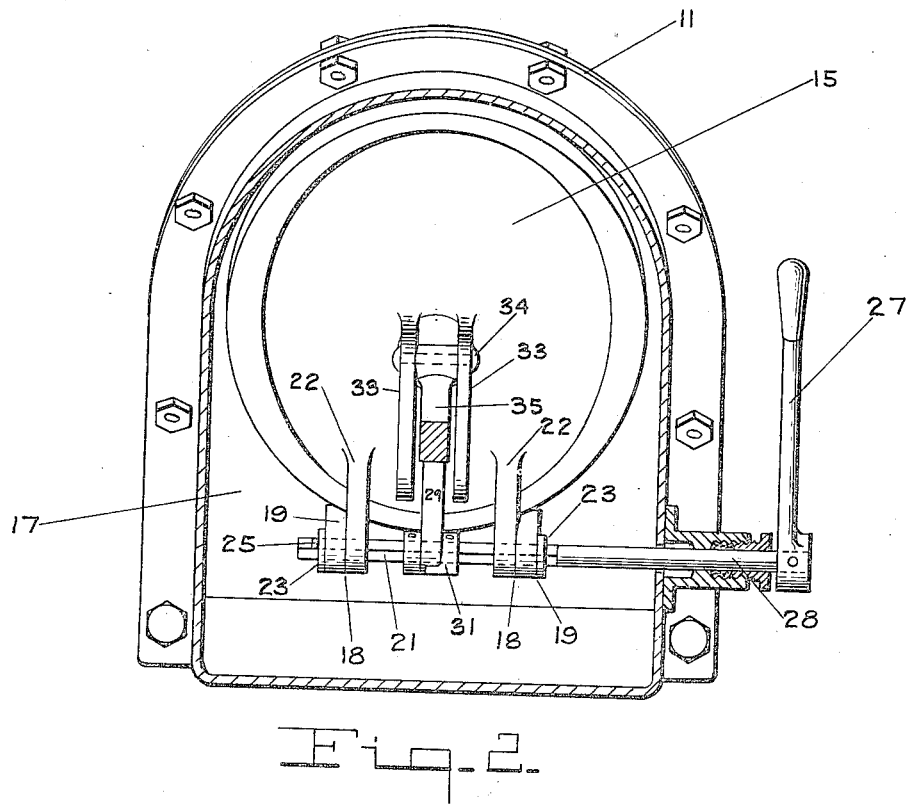
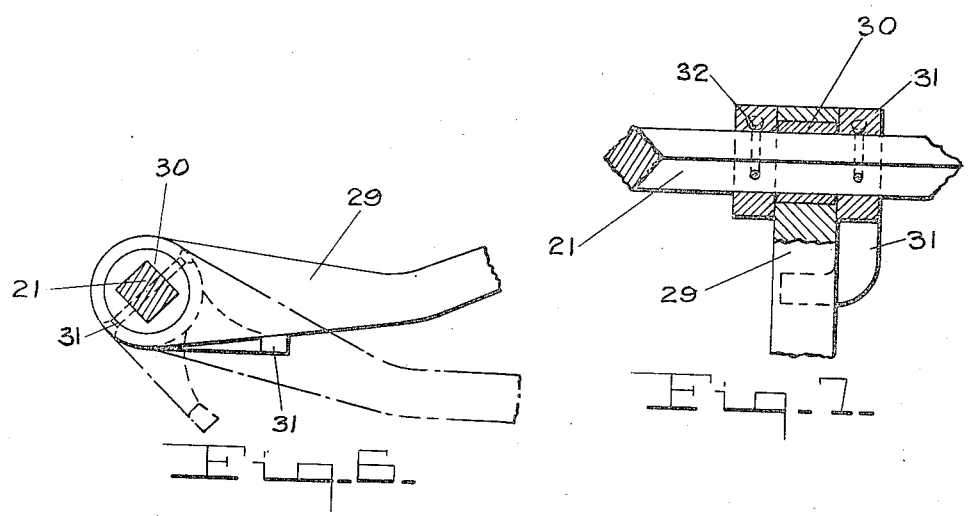
INVENTOR
ROBERT W. COLLISON
BY
ATTORNEY Patented Feb. 1, 1938

2,106,723

UNITED STATES PATENT OFFICE 2,106,723

QUICK CLOSING AND SEALING VALVE

Robert W. Collison, Takoma Park, Md.

Application December 14, 1936, Serial No. 115,840

5 Claims. (Cl. 251—10)

(Granted under the act of March 3, 1883, as amended April 30, 1928; 370 O. G. 757)

My invention relates to new and useful improvements in a quick closing and sealing valve having a large amplitude of motion for ventilating or pipe lines on shipboard to exclude gases, air and water; on submarines to admit of ventilation and to be quickly closed for diving, and for many other purposes requiring quick opening or quick closing with air tight sealing.

In the attainment of my invention I employ the valve with two operating means functioning from fixed points in proximity to the valve for its opening, closing and sealing. One of the means is a quick-motion manually operated means adapted to quickly close the valve, and the second means is a slow screw or cam motion means for sealing the closed valve against the seat. The second means is quick acting because its extent of required motion is very small. The large amplitude of motion of the valve in order to be quickly actuated by such two means functioning from such points created the problem which I am first to solve, of keeping the fixed point from which the second means functions sufficiently remote from the valve to afford it its required large amplitude of motion in opening and closing, and yet afford its slow screw or cam motion its requisite quickness of sealing the valve. In such solution I provided the second means with a movable means intermediate the valve and the second means which movable means I control by the first means, which in closing the valve places and maintains the movable means in position against the valve to tightly seal the valve with a very small extent of motion which is quickly applied. I prefer to mount the movable means such that it may, in being moved by the first means into sealing relation between the valve and the second means, exert a cam or toggle action upon the valve and thus seal the valve against its seat without the necessity of operating the second means except to compensate for wear or to afford an unusually tight seal.

My invention consists in the structures, arrangements and combinations of the parts heretofore and hereafter described and to be pointed out in the claims.

In the accompanying drawings, forming a part of this specification, and in which like numerals are employed to designate like parts throughout the same, Fig. 1 is a cut away side view of a pipe line containing my quick closing and sealing valve;

Fig. 2 is a section on the line 2—2 of Fig. 1 except that the stuffing box surrounding the hinge pin is shown in section;

Fig. 6 is a sectional side view showing details of the lug and the arm features of my invention, and Fig. 7 is a cut away sectional end view of the lug and the arm details.

Figure 1:
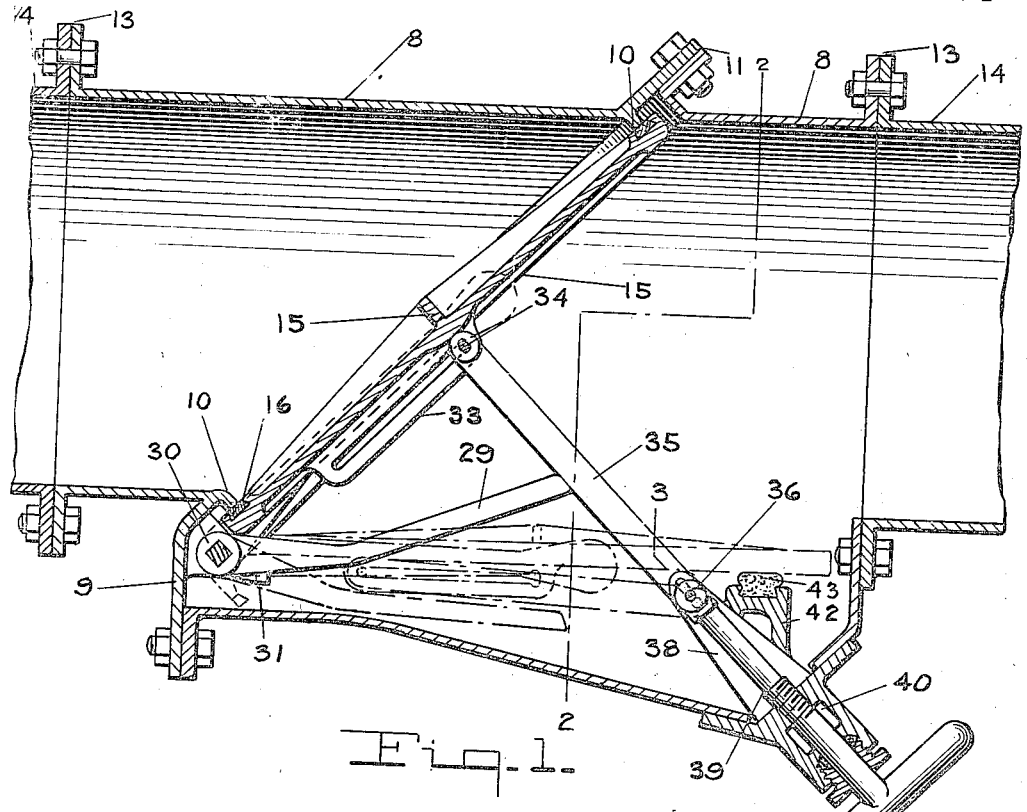
Figures 3, 4, 5:
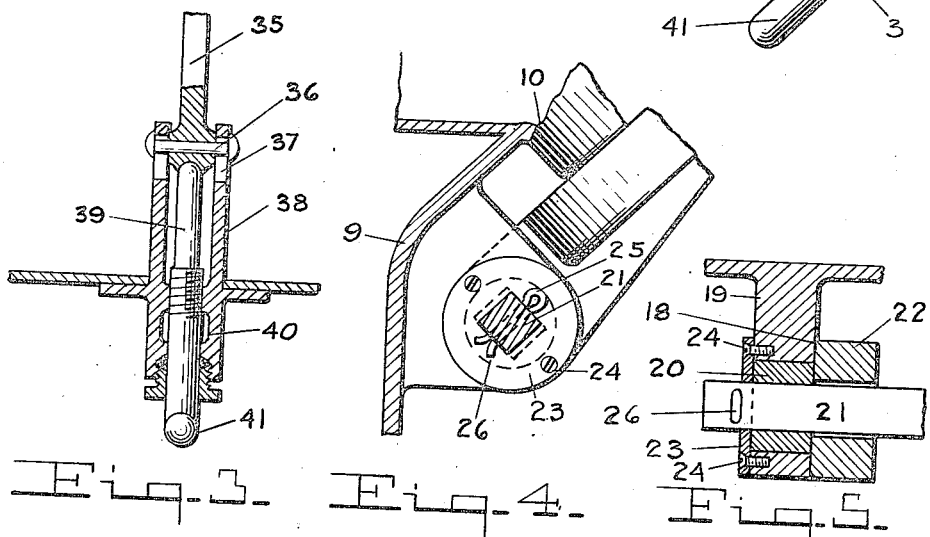
Fig. 3 is a partially cut away section on the line 3—3 of Fig. 1.
Fig. 4 is an enlarged fragmentary side view, partly in elevation and partly in section, of the hinge detail of the valve.
Fig. 5 is a sectional end view of the hinge detail of the valve.

In the drawings, wherein for the purpose of illustration is shown a preferred embodiment of my invention, the number 8 represents a valve housing, with a bonnet offset 9, and an annular valve seat 10. The valve housing 8 consists of two parts, each having a flange, which flanges are respectively bolted together at 11. The outer ends of the valve housing 8 have flanges at 13 and 13' to enable the housing to be inserted in a pipe or ventilator line 14. Enclosed within the valve-housing 8 is a hinged valve 15 containing an annular rubber packing ring 16, so constructed that when the valve 15 is closed it will come in contact with the annular valve seat 10.

Within the bonnet off-set 9 is a baffle 17 which forms the frame of the annular valve seat 10. The valve 15 is attached to this baffle 17 by means of hinges 18. A hinge plate 19 is welded to the baffle 17 and contains a bushing 20 through which a square hinge-pin 21 passes; a hinge plate 22 is welded to valve 15 and contains a squared hole through which the squared hinge-pin passes. This hole is made slightly larger than the hinge-pin 21 to allow the valve to be tightly sealed against the valve seat 10. The hinge pin 21 is held in position by means of face plates 23, machine screws 24, cotter key 25 and key way 26.

Motion is imparted to the valve 15 by means of a handle 27 and through a rounded extension of the hinge pin 21 passing through a stuffing box 28. Located on the hinge pin 21 midway between the hinges is a loosely mounted bent arm 29 which is free to turn on a bushing 30. This bushing is enclosed by a fixed lug 31 which is bent 90° at its outer end so that it may contact the loose arm 29. The lug 31 is secured to the hinge pin 21 by means of keys 32. Elongated parallel ears 33 located on the underneath face of the valve 15 and forming integral parts therewith are slotted to receive a pin 34 which is inserted in the end of a prop 35. Prop 35 is fitted with a pin 36 which travels in slotted portion 37 of a housing 38 through which a jack screw 39 travels. This jack screw 39 is arranged so that its end comes in contact with the end of prop 35 and passes through stuffing box 40 and terminates in the handle 41. A bracket 42 is secured to the housing 38 and supports a buffer 43.

In order to open the valve it is only necessary to back off the jack screw 39 by two or three turns of the handle 41. This releases the pressure on valve 15 exerted through the prop 35 and allows gravity to act upon it and unseat it. The valve 15 thus being unseated may be opened by means of moving the handle 27 in a counter-clockwise direction, thus imparting motion to the valve 15 through the hinge pin 21. This same motion imparts movement to the lug 31 and allows the arm 29 to drop and the end of prop 35 to travel down the slotted ears 33, the prop 35 turning on the pivot formed by the pin 36. The valve 15 is turned until it rests on the buffer 43.

The broken lines of Fig. 1 show the valve in its open position. To close and secure, the handle 27 is turned in a clockwise direction. This closes the valve, and when the valve is half closed the lug 31, actuated by the hinge pin 21, engages the arm 29 and raises it so that it will engage the prop 35, and when the valve is closed the prop 35 will be in line with the jack screw 39. The handle 41 is then given two or three turns which causes the jack screw 39 to force the valve 15 against its seat 10, thus securing a fluid tight fit.

It is to be understood that the form of my invention, herewith shown and described, is to be taken as a preferred example of the same, and that various changes in the shape, size and arrangement of parts may be resorted to, without departing from the spirit of my invention, or the scope of the appended claims.

The invention described herein may be manufactured and used by or for the Government of the United States of America for governmental purposes without the payment of any royalties thereon or therefor.

Having thus set forth and disclosed the nature of the invention, what is claimed is:

1. A valve housing with bonnet offset and containing a valve seat as an integral part; a hinge pin, rotatably mounted within and extending through a stuffing box in said bonnet offset to which is attached means for manually operating said hinge pin; a valve containing an annular rubber packing ring and mounted upon said hinge pin within the valve housing in such a manner that when the hinge pin is rotated the valve will be caused to close upon the valve seat; a bent arm loosely mounted upon the hinge pin and to which movement is imparted by means of a lug rigidly mounted upon the hinge pin; a prop slidably mounted to the underneath side of the valve and so placed that when the bent arm is raised it will come in contact with the prop and cause the upper end of the prop to slide along the slots in the underneath side of the valve; this prop is slidably pivoted on its lower end in slots contained in a jack screw housing; a manually operated jack screw mounted in a stuffing box, and so centered that its inner end will be opposed to the lower end of the prop after the valve is in a closed position, and used to tightly seal the valve upon the valve seat.

2. A quick sealing valve comprising a valve housing, a valve seat in said valve housing, a valve bonnet offset from said valve housing, a valve member; a pin journalled in said valve bonnet and having a non-circular end, hinge plate means secured to said valve member and having hinge pin receiving openings corresponding in shape to said hinge pin, whereby rotation of said hinge pin moves said valve member, the opening in said hinge plate means being somewhat larger than the hinge pin portions extending therethrough, permitting slight relative motion therebetween, a prop, a pin and slot connection between one end of said prop and said valve member, a jack screw extending through said valve housing, a pin and slot connection between the end of said jack screw and the other end of said prop, an arm freely pivoted on said hinge pin beneath said prop and a short lug fixed on said hinge pin adapted to contact said pivoted arm and raise said prop to a straight line position with said jack screw when said valve is in closed position, whereby said jack screw may be operated through said prop to quickly force said closed valve member to sealed position.

3. A quick sealing valve comprising a valve housing, a valve seat in said housing, a valve member, exterior means for quickly moving said valve member to relatively closed position and exterior means for moving said relatively closed valve to sealed position, said first mentioned means comprising a hinge pin journalled in said valve housing, a handle for rotating said hinge pin without said housing, and lost motion means securing said hinge pin to said valve member.

4. A quick sealing valve comprising a valve housing, a valve seat in said housing, a valve member, means for quickly moving said valve member to relatively closed position and means for moving said relatively closed valve to sealed position, said first mentioned means comprising a hinge pin journalled in said valve housing, a handle for rotating said hinge pin without said housing, lost motion means securing said hinge pin to said valve member, a jack threaded through the valve housing, said jack including a prop and a pin and slot connection between said prop and the valve member permitting said prop to fold out of the path of the valve member as it opens, and an arm secured on said hinge pin for unfolding said prop to jack position as said valve member is moved toward closed position, whereby said jack may seal said valve member when in closed position.

5. In combination with a valve housing, a valve and a seat, a manually operated handle, a hinge pin connection between said valve and said handle, a lug rigidly mounted on said hinge pin connection, an arm rotatably mounted on said hinge pin connection, a manually operated exterior screw jack, and an abutting prop slidably connected to the underside of the aforementioned valve and forming a connection between said valve and said exterior screw jack.

ROBERT W. COLLISON.